June 24, 1969    H. MOCZALA ET AL    3,452,262
DIRECT CURRENT MOTOR WITH TRANSISTORIZED POWER SUPPLY
Filed Sept. 22, 1966

Inventor:
Helmut Moczala
Willi Otzipka
BY Spencer & Kaye
Attorneys

United States Patent Office 3,452,262
Patented June 24, 1969

3,452,262
DIRECT CURRENT MOTOR WITH TRANSISTORIZED POWER SUPPLY
Helmut Moczala, Oldenburg, and Willi Otzipka, Berlin, Germany, assignors to Licentia Patent-Verwaltungs-G.m.b.H., Frankfurt am Main, Germany
Filed Sept. 22, 1966, Ser. No. 581,343
Claims priority, application Germany, Sept. 22, 1965, L 51,683
Int. Cl. H02k 29/02
U.S. Cl. 318—138          5 Claims

ABSTRACT OF THE DISCLOSURE

A transistorized power supply for a D.C. motor in which a plurality of transistors are connected to a potential source and to the stator windings, the transistors being operable between two conditions in one of which the respective stator winding is energized and in the other of which the stator winding is de-energized. Also provided are a plurality of magnetic field dependent resistors which are directly connected to less than all of the transistors for driving the same into the condition where the stator winding is de-energized.

---

The present invention relates to a transistorized power supply for a D.C. motor. More particularly, the present invention relates to a transistorized power supply for controlling the rotational speed of a direct current motor.

There exist transistorized power supplies for direct current motors wherein the transistors are operated between non-conductive and conductive conditions in accordance with a high-frequency oscillator circuit in which they are arranged. The motors so controlled may be used for driving battery operated tape recorders and record players. Since such motors are frequently used together with other electronic devices, the high-frequency radiations emanating from the oscillator circuit may generate noise in these other electronic circuits. Accordingly, the oscillator circuit has to be shielded to protect the adjacent electronic devices.

It is an object of the present invention to provide a new and improved transistorized power supply for a motor.

The second object of the present invention is to provide a transistorized power supply which accurately controls the rotational speed of a direct current motor.

A further object of the present invention is to provide a transistorized power supply for a direct current motor using magnetic field dependent resistors arranged in circuit with some of the transistors.

With the above objects in view, the present invention resides, mainly, in a transistorized power supply for a direct current motor having a rotor producing a magnetic field and a stator. Means forming stator windings are provided as is a potential source for energizing the windings. A plurality of transistors are connected in circuit with the potential source and with the stator windings. Each of the transistors is operable between a first condition wherein one of the stator windings is energized and a second condition wherein the one stator winding is de-energized. A plurality of magnetic field dependent resistors is provided. These resistors are directly connected in circuit with less than all of the transistors.

Figure 1:
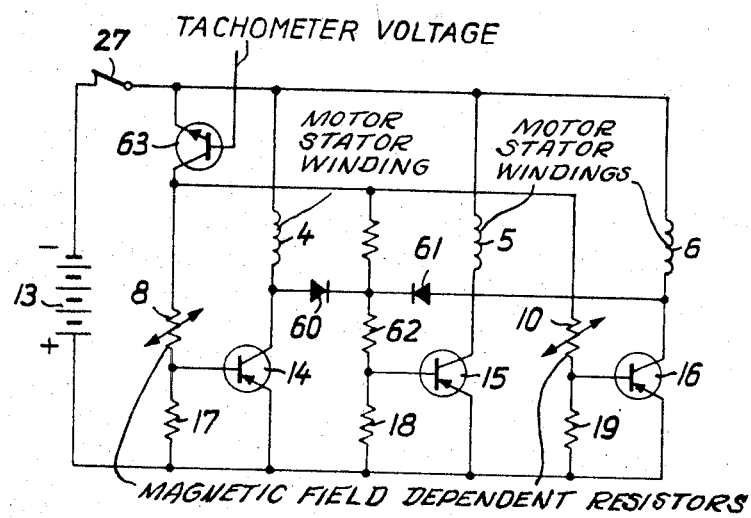
Figure 2:
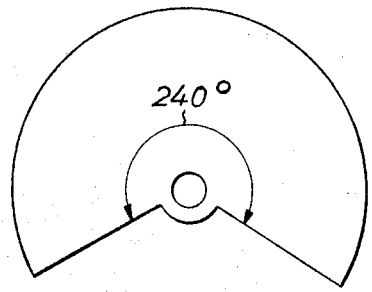

Additional objects and advantages of the present invention will become apparent upon consideration of the following description when taken in accordance with the accompanying drawing in which FIGURE 1 is an electrical schematic diagram of the transistorized power supply and FIGURE 2 a soft iron segment constructed in accordance with the principles of the present invention.

Referring to the drawing, the stator windings are designated by the reference numerals 4, 5 and 6. Although not illustrated, it is clear that these may be arranged about the periphery of the stator, generally equally spaced thereabout. Connected in circuit with the stator windings 4, 5 and 6 are transistors 14, 15 and 16, respectively. The transistor 14 is connected in circuit with the stator winding 4; the transistor 15 is connected in circuit with the stator winding 5; and the transistor 16 is connected in circuit with the stator winding 6. A potential source 13 is arranged across the connection of the transistors and stator windings.

Each of the bases of the transistors 14, 15 and 16 is connected to the junction of a voltage divider. Thus, the base of the transistor 14 is connected between the magnetic field dependent resistor 8 and the resistor 17; the transistor 15 is connected between resistors 62 and 18; and the transistor 16 is connected between the magnetic field dependent resistor 10 and the resistor 19.

The magnetic field dependent resistors 8 and 10 are made of a material such as indium antimonide which has the property of substantially changing its resistance when the material is subjected to a magnetic field.

The magnetic field dependent resistors 8 and 10 are arranged in such a manner that they are each subjected to a magnetic field which abruptly increases their resistance once for every rotation of the rotor of the motor. One way of doing this, for example, is to space the resistors 8 and 10 about the stator in a magnetic field path which is completed by a soft iron segment that rotates with the rotor and cooperates with each of the resistors 8 and 10 once per revolution of the rotor to complete the magnetic field path through the resistor.

Connected in common with all of the voltage dividers is a control transistor 63 having its collector connected to the voltage dividers while its emitter is connected to one side of the potential source 13, when the switch 27 is closed. It should be noted that the transistor 63 is an NPN transistor while the transistors 14, 15 and 16 are PNP transistors.

The transistor 63 is connected to a tachometer voltage source (not illustrated) which produces a voltage proportional to the rotational speed of the rotor, the control transistor 63, normally being maintained in its conductive condition. The tachometer potential may be derived in the manner shown, for example, in Patent No. 3,274,471 issued Sept. 20, 1966.

In operation, the switch 27 is closed to energize the transistorized power supply and the stator windings for the rotation of the permanent magnet rotor of the motor. The circuit of the drawing is arranged so that one of the transistors 14, 15 and 16 will be conducting and the other two transistors will be in their non-conducting condition. As indicated above, the magnetic field dependent resistors 8 and 10 are subjected to a magnetic field once per revolution of the rotor shaft. Thus, when the magnetic segment on the rotor is adjacent the magnetic field dependent resistor 8 and subjects the same to a magnetic field, the resistance of the resistor 8 is substantially increased. This renders the PNP transistor 14 non-conductive and de-energizes the stator winding 4.

Since, at this time, the magnetic field dependent resistor 10 is not in a magnetic field, its resistance is low and its respective transistor 16 conducts so that the stator winding 6 is energized.

Due to the conduction of the transistor 16 and the application of voltage through diode 61 to the base circuit of the transistor 15, the transistor 15 will be in its non-conductive condition.

When the magnetic segment rotating with the rotor of the motor is adjacent to the resistor 10, its resistance will be substantially increased and the transistor 16 will be rendered non-conductive. Thus its stator winding 6 will be de-energized.

If, at this time, the resistor 8 is not subjected to a magnetic field, the transistor 14 will be in conductive condition and its respective stator winding 4 will be energized. When the transistor 14 is conducting, the voltage applied through the diode 60 to the base circuit of the transistor 15 renders the transistor 15 non-conductive.

If the magnetic segment is opposite both resistors 8 and 10 at the same time, both of these resistors will be subjected to a magnetic field and their respective resistances will be substantially increased. Thus, both transistors 14 and 16 will be rendered non-conductive. At this time, the transistor 15 will be rendered conductive since it no longer has applied to its base any voltage through the rectifier 60 or 61. Thus the stator winding 5 will be energized by the conducting transistor 15.

The energization cycle of the rotor windings will continue in this manner. That is, first the magnetic segment will be opposite the resistor 8 rendering transistors 14 and 15 non-conductive while transistor 16 conducts. Secondly, the magnetic iron segment will be opposite the resistor 10, rendering transistors 16 and 15 non-conductive while transistor 14 conducts. Finally, the magnetic segment will be opposite both resistors 8 and 10 simultaneously, so that transistors 14 and 16 will become non-conductive while transistor 15 will be conductive.

It is thus seen that at all times during the rotational cycle of the rotor, one of the stator windings 4, 5 and 6 will be energized while the other two will be de-energized. In this fashion, the speed of the rotor will continue until a pre-selected operating speed is reached. At this time, the tachometer voltage which is proportional to the rotational speed of the rotor will render the control transistor 63 non-conductive.

When transistor 63 is rendered non-conductive, the three transistors 14, 15 and 16 will all remain in their non-conductive conditions regardless of the position of the magnetic segment of the motor. Thus, none of the stator windings 4, 5 or 6 will be energized during a revolution of the rotor and the speed of the rotor will decrease.

When the rotational speed of the rotor decreases below the pre-selected operating speed, the resultant tachometer voltage will decrease and again operate the transistor 63 into its conductive condition. At this time, the normal regulation provided by the transistors 15 and 16 and the magnetic field dependent resistors 8 and 10 will again become operative.

It is thus seen from the above arrangement that the motor may rotate and be maintained at a desired operating speed with a high degree of accuracy without using a high frequency oscillator circuit which may interfere with the other electronic devices associated therewith.

It can also be seen that with the above arrangement it is not necessary that each of the transistors 14, 15 and 16 be provided with magnetic field dependent resistors directly connected in circuit therewith.

In order to accomplish the above purpose, the soft iron segment may be pie-shaped, covering a sector of 240° with the two magnetic field dependent resistors being angularly displaced from each other by 120 (as shown in FIGURE 2).

It will be understood that the above description of the present invention is susceptible to various modifications, changes, and adaptations, and same are intended to be comprehended within the meaning and range of equivalents of the appended claims.

What is claimed is:

1. In a transistorized power supply for a direct current motor, the combination comprising:
    (a) means forming stator windings;
    (b) a potential source for energizing said windings;
    (c) a plurality of first transistors connected in circuit with said potential source and said stator windings, said transistors each being operable between a first condition wherein one of said stator windings is energized and a second condition wherein said stator winding is de-energized; and
    (d) a plurality of magnetic field dependent resistors directly connected to less than all of said transistors for driving one of said transistors into its second condition.

2. A transistorized power supply as defined in claim 1 wherein with $n$ stator windings, $n$ transistors connected in circuit therewith are used and a respective magnetic field dependent resistor is connected with each of $n-1$ transistors.

3. A transistorized power supply arrangement as defined in claim 2 wherein said magnetic field dependent resistors are respectively connected in the base circuit of their respective transistors, and a plurality of rectifiers, a respective rectifier being connected between the collector of each of said transistors having magnetic field dependent resistors and the base electrode of the transistor having no magnetic field dependent resistor connected in circuit therewith, whereby said transistor having no magnetic field dependent resistor connected in circuit therewith is operated into its first condition only when all of the magnetic dependent resistors are simultaneously subjected to a magnetic field.

4. A transistorized power supply for a direct current motor as defined in claim 3 wherein a control transistor is connected in circuit with all of said first transistors, said control transistor being normally in its conductive condition and being subjected to a tachometer voltage which renders said control transistor non-conductive whenever a pre-selected operating speed is reached, whereby all of said plurality of first transistors are driven into their respective first condition.

5. A transistorized power supply as defined in claim 1 wherein, in said first condition, said transistors are conductive and, in said second condition, said transistors are non-conductive.

References Cited

UNITED STATES PATENTS 3,242,404   3/1966   Favre _____ 318—138
3,305,717   2/1967   Weiss _____ 318—254

ORIS L. RADER, *Primary Examiner.*

H. HUBERFELD, *Assistant Examiner.*

U.S. Cl. X.R.

318—327, 345